United States Patent
Ide et al.

(10) Patent No.: US 12,257,710 B2
(45) Date of Patent: Mar. 25, 2025

(54) ROBOT HAND AND METHOD FOR CONTROLLING ROBOT HAND

(71) Applicant: SHINANO KENSHI CO., LTD., Ueda (JP)

(72) Inventors: Kenta Ide, Nagano (JP); Yukio Shinozuka, Nagano (JP); Takeshi Sasaki, Nagano (JP)

(73) Assignee: SHINANO KENSHI CO., LTD., Ueda (JP)

( * ) Notice: Subject to any disclaimer, the term of this patent is extended or adjusted under 35 U.S.C. 154(b) by 290 days.

(21) Appl. No.: 17/960,299

(22) Filed: Oct. 5, 2022

(65) Prior Publication Data

US 2023/0136450 A1 May 4, 2023

(30) Foreign Application Priority Data

Oct. 29, 2021 (JP) .................................. 2021-177799
Aug. 26, 2022 (JP) .................................. 2022-134687

(51) Int. Cl.
  *B25J 9/16* (2006.01)
  *B25J 13/08* (2006.01)
(52) U.S. Cl.
  CPC ........... *B25J 9/1612* (2013.01); *B25J 13/082* (2013.01)

(58) Field of Classification Search
  CPC ...... B25J 9/1612; B25J 13/082; B25J 9/1633; B25J 11/00; B25J 19/00; G05B 2219/39478; G05B 2219/39505
  See application file for complete search history.

(56) References Cited

U.S. PATENT DOCUMENTS

| | | | |
|---|---|---|---|
| 2013/0090761 A1* | 4/2013 | Sejimo | H02P 27/08 318/434 |
| 2019/0143534 A1 | 5/2019 | Watanabe et al. | |

FOREIGN PATENT DOCUMENTS

| | | | |
|---|---|---|---|
| JP | 2001038667 A | * | 2/2001 |
| JP | 2001-062765 A | | 3/2001 |
| JP | 2014-193504 A | | 10/2014 |
| JP | 2018-069381 A | | 5/2018 |
| JP | 2019-089186 A | | 6/2019 |

OTHER PUBLICATIONS

Sep. 19, 2023 Office Action issued in Japanese Patent Application No. 2022-134687.

* cited by examiner

*Primary Examiner* — Adam R Mott
*Assistant Examiner* — Matthew C Gammon
(74) *Attorney, Agent, or Firm* — Oliff PLC

(57) ABSTRACT

A robot hand includes a motor, claws configured to grip a workpiece in accordance with rotation of the motor, an encoder configured to detect a rotational position of the motor, and a control device configured to control a torque of the motor such that the claws grip the workpiece in accordance with the rotational position.

4 Claims, 7 Drawing Sheets

ROBOT HAND AND METHOD FOR CONTROLLING ROBOT HAND

CROSS-REFERENCE TO RELATED APPLICATION

This application is based upon and claims the benefit of priority of the prior Japanese Patent Application No. 2021-177799, filed on Oct. 29, 2021, and the prior Japanese Patent Application No. 2022-134687, filed on Aug. 26, 2022, the entire contents of which are incorporated herein by reference.

BACKGROUND

(i) Technical Field

The present disclosure relates to a robot hand and a method for controlling a robot hand.

(ii) Related Art

There is known a robot hand including claws for gripping a workpiece. Such a conventional robot hand is operated by setting a gripping force so as to grip a workpiece having a predetermined specific shape or material. However, when an unspecified variety of workpieces are gripped by the conventional robot hand, if the gripping force of the claws is too strong with respect to the material of the workpiece, the workpiece might be damaged. As a result, if the gripping force is too weak with respect to the material of the workpiece, the workpiece might fall while being gripped. As described above, in the conventional robot hand, it is difficult to grip an unspecified variety of workpieces with an appropriate gripping force without changing the gripping force setting according to the type of the workpiece. In order to realize control such that "a hard workpiece is firmly gripped and a soft workpiece is gripped with a minute force" for an unspecified variety of workpieces, a pressure sensor for detecting a gripping force may be provided in the robot hand to adjust the gripping force. However, the provision of a pressure sensor increases manufacturing costs. On the other hand, there is a technique in which a deformation ratio of a workpiece in which a displacement amount of a claw and a gripping force are associated with each other is obtained in advance, and the gripping force of the claw is controlled in accordance with the deformation ratio (See, for example, Japanese Unexamined Patent Application Publication No. 2018-069381).

SUMMARY

According to an aspect of the present disclosure, there is provided a robot hand including a motor; claws configured to grip a workpiece in accordance with rotation of the motor; an encoder configured to detect a rotational position of the motor; and a control device configured to control a torque of the motor such that the claws grip the workpiece in accordance with the rotational position, wherein the control device includes: a limiting unit configured to execute a limiting process of limiting the torque to a torque limit value or less; an estimation unit configured to estimate that the claws have come into contact with the workpiece when a change speed of the rotational position becomes equal to or less than a threshold value during execution of the limiting process; an increasing unit configured to execute an increasing process of gradually increasing the torque to be higher than the torque limit value after the claws come into contact with the workpiece; a calculation unit configured to calculate a movement amount from a position at which the claws are in contact with the workpiece to a current position based on the rotational position during execution of the increasing process; and a maintaining unit configured to execute a maintaining process of maintaining the torque when the torque becomes equal to or greater than a torque upper limit value that is greater than the torque limit value or the torque when the movement amount becomes equal to or greater than a movement amount upper limit value, during execution of the increasing process.

According to another aspect of the present disclosure, there is provided a method for controlling a robot hand, including: limiting a torque of a motor that drives claws to grip a workpiece to a torque limit value or less; estimating that the claws have come into contact with the workpiece when a change rate of the rotational position of the motor becomes equal to or less than a threshold value during execution of the limiting process; executing an increasing process of gradually increasing the torque to be higher than the torque limit value after the claws come into contact with the workpiece; calculating a movement amount from a position at which the claws are in contact with the workpiece to a current position based on the rotational position during execution of the increasing process; and executing a maintaining process of maintaining the torque when the torque becomes equal to or greater than a torque upper limit value that is greater than the torque limit value or the torque when the movement amount becomes equal to or greater than a movement amount upper limit value, during execution of the increasing process.

DETAILED DESCRIPTION

Figure 1:
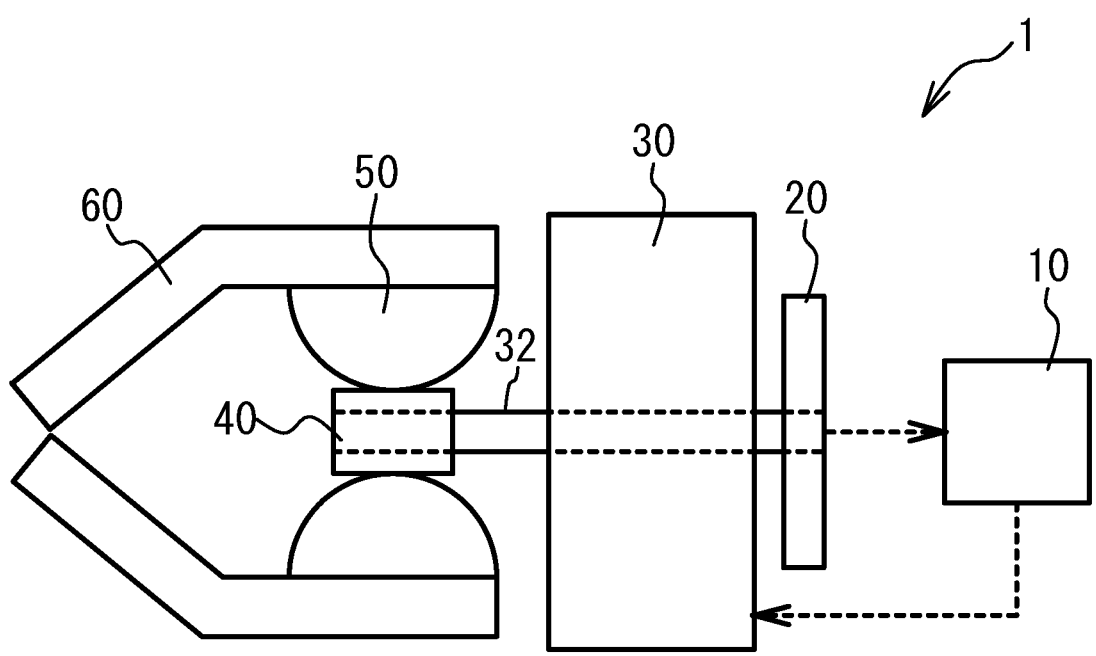
FIG. 1 is a schematic configuration view of a robot hand.

FIG. 1 is a schematic configuration view of a robot hand 1. The robot hand 1 includes a control device 10, an encoder 20, a motor 30, a drive gear 40, a driven gear 50, and claws 60. The control device 10 controls the operation of the entire robot hand 1. The motor 30 is a drive source for opening and closing the claws 60, and is, for example, a stepping motor or a brushless DC motor. The encoder 20 is provided at a proximal end of a rotation shaft 32 of the motor 30, and detects a rotational position of the motor 30 (a rotational angle of the rotation shaft 32 of the motor 30). The encoder 20 may be of an optical type or a magnetic type. The drive gear 40 is provided at a distal end of the rotation shaft 32 of the motor 30 and meshes with the driven gear 50. The rotational force of the motor 30 is transmitted from the drive gear 40 to the driven gear 50 via the rotation shaft 32. The driven gear 50 has a substantially semicircular shape, and teeth are formed on an arc-shaped outer peripheral surface. The meshing mechanism between the drive gear 40 and the driven gear 50 is, for example, a worm gear, but may be a screw gear or other gears. A proximal end portion of the claw 60 is fixed to the driven gear 50. Although only two pairs of the driven gear 50 and the claw 60 are illustrated in FIG. 1, three or more pairs of the driven gear 50 and the claw 60 may be provided.

When the motor 30 rotates in the forward direction, the driven gear 50 swings in one direction corresponding to the meshing with the drive gear 40, and the distal end portions of the claws 60 approach each other. When the motor 30 rotates in the reverse direction, the driven gear 50 swings in the opposite direction which is opposite to the above-described one direction, and the tip portions of the claws 60 are separated from each other. When the distal end portions of the claws 60 approach each other, it is possible to grip a workpiece that is a gripping target. The workpiece is released by separating the distal end portions of the claws 60 from each other. In this manner, the claws 60 are opened and closed by switching the rotation of the motor 30 between the forward rotation and the reverse rotation.

Figure 2:
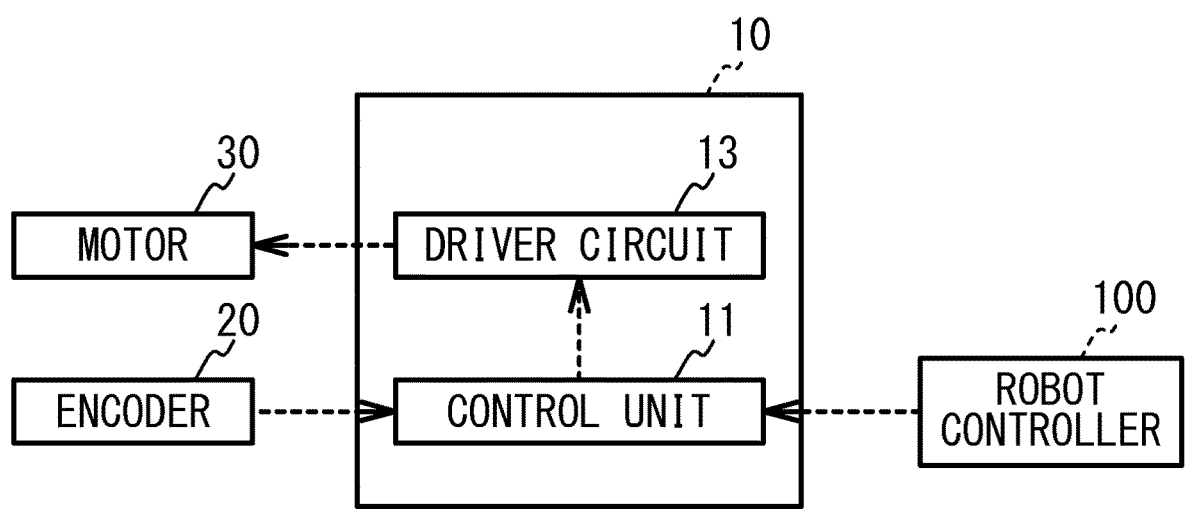
FIG. 2 is a block view illustrating a schematic configuration of a control device for a robot hand.

FIG. 2 is a block view illustrating a schematic configuration of the control device 10. The robot hand 1 is used by being fixed to a distal end of a robot arm. In addition, the control device 10 controls the driving of the motor 30 in response to a command from a robot controller 100 that controls the entire operation of the robot hand 1 and a robot arm. The control device 10 includes a control unit 11 and a driver circuit 13. The control unit 11 is mainly configured by a microcomputer or the like, and includes a CPU, a ROM, a RAM, an I/O, a bus line connecting these components, and the like, none of which are illustrated. Each process in the control unit 11 may be a software process in which a program stored in advance in a tangible memory (that is, a readable temporary tangible recording medium) such as a ROM is executed by a CPU, or may be a hardware process by a dedicated electronic circuit using a field programmable gate array (FPGA) or the like.

The control unit 11 calculates the position and the movement amount of the claws 60 based on the detection signal from the encoder 20. As described above, since the opening and closing of the claws 60 is performed by transmitting the rotational force from the drive gear 40 to the driven gear 50 by the rotation of the motor 30, the state of the opening and closing of the claws 60 is grasped by the rotational angle of the rotation shaft 32 obtained by the detection signal from the encoder 20. When the motor 30 is a stepping motor, the driver circuit 13 includes a switching element that controls energization of a coil of each phase, and controls driving of the motor 30 by switching energization of a winding of each phase of the motor 30. In the driver circuit 13, in addition to using the function of a general-purpose IC for controlling the motor 30, a shunt resistor is provided and its potential difference is A/D converted. Accordingly, the control unit 11 grasps the current of the coil of each phase of the motor 30. Similarly, in the driver circuit 13, by using a function of a general-purpose IC for controlling the motor 30, it is possible to set an effective value of energization of each phase of the coil of the motor 30 by modulation such as PWM. Further, the control unit 11 is capable of estimating the torque T of the motor 30 based on the current of the coil of each phase and the detection signal from the encoder 20. As described above, the control unit 11 is capable of controlling the current of the coil of each phase of the motor 30.

Therefore, the control unit 11 is capable of arbitrarily setting the torque T by setting the current of the coil of each phase of the motor 30 with reference to the detection signal from the encoder 20. In this way, the control unit 11 is capable of controlling the driving of the motor 30 by issuing a command to the driver circuit 13 based on the detection signal from the encoder 20, and is capable of finally controlling the opening and closing of the claws 60.

Figure 3:
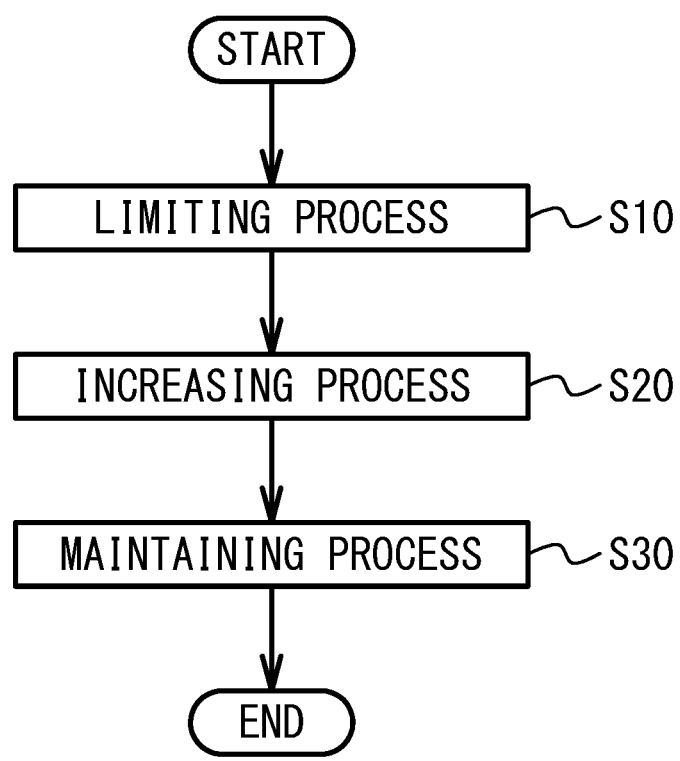
FIG. 3 is a flowchart illustrating an example of gripping control.

Next, the gripping control performed by the control unit 11 of the control device 10 will be described. FIG. 3 is a flowchart illustrating an example of the gripping control. The control unit 11 first executes a limiting process for limiting the torque T of the motor 30 (step S10), then executes an increasing process for increasing the torque T of the motor 30 (step S20), and then executes a maintaining process for maintaining the torque T of the motor 30 (step S30). The restriction process will be described below.

Figure 4:
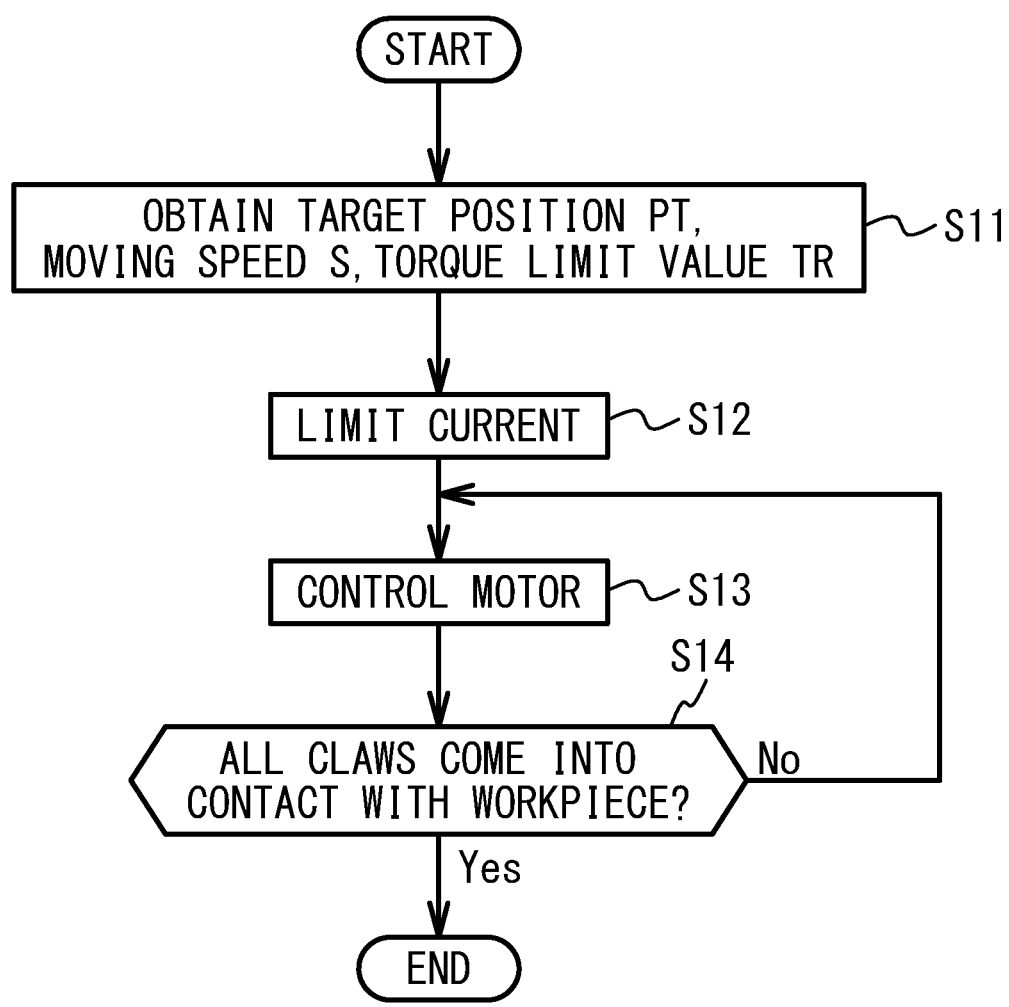
FIG. 4 is a flowchart illustrating an example of restriction process.

FIG. 4 is a flowchart illustrating an example of the restriction process. The control unit 11 obtains a target position Pt of the claws 60, a moving speed S of the claws 60, and the torque limit value Tr of the motor 30 based on a command from the robot controller 100 (step S11). Next, the control unit 11 controls the motor 30 so that the claws 60 moves from the current position toward the target position Pt at the moving speed S (step S13) while limiting the current applied to the motor 30 by outputting a command to the driver circuit 13 so that the torque T of the motor 30 becomes constant at the torque limit value Tr or less (step S12). As a result, the claws 60 moves so as to be closed when the torque T of the motor 30 is relatively weak torque equal to or less than the torque limit value Tr.

Next, the control unit 11 determines whether or not all of the claws 60 have come into contact with the workpiece in a state in which the torque T of the motor 30 is limited (step S14). Specifically, it is determined whether or not the rate of change in the rotational position of the motor 30 (the amount of change per unit time in the rotational angle of the rotation shaft 32) has become equal to or less than a threshold value $\alpha$. The threshold value $\alpha$ is set to a value smaller than a change speed of the rotational position of the motor 30 corresponding to the moving speed S described above. That is, it is determined whether or not the moving speed S has decreased to a moving speed corresponding to the threshold value $\alpha$. The change speed of the rotational position is calculated by the encoder 20 based on the rotation amount of the motor 30 within a predetermined time. When the change speed of the rotational position of the motor 30 is higher than the threshold value $\alpha$, it is determined that all the claws 60 are not yet in contact with the workpiece. When the change speed of the rotational position of the motor 30 decreases to the threshold value $\alpha$ or less, it is determined that all the claws 60 have come into contact with the workpiece. In the case of No in step S14, the process of step S13 is executed again. In the case of Yes in step S14, the limiting process ends, and then the increasing process described above is executed.

Figure 5:
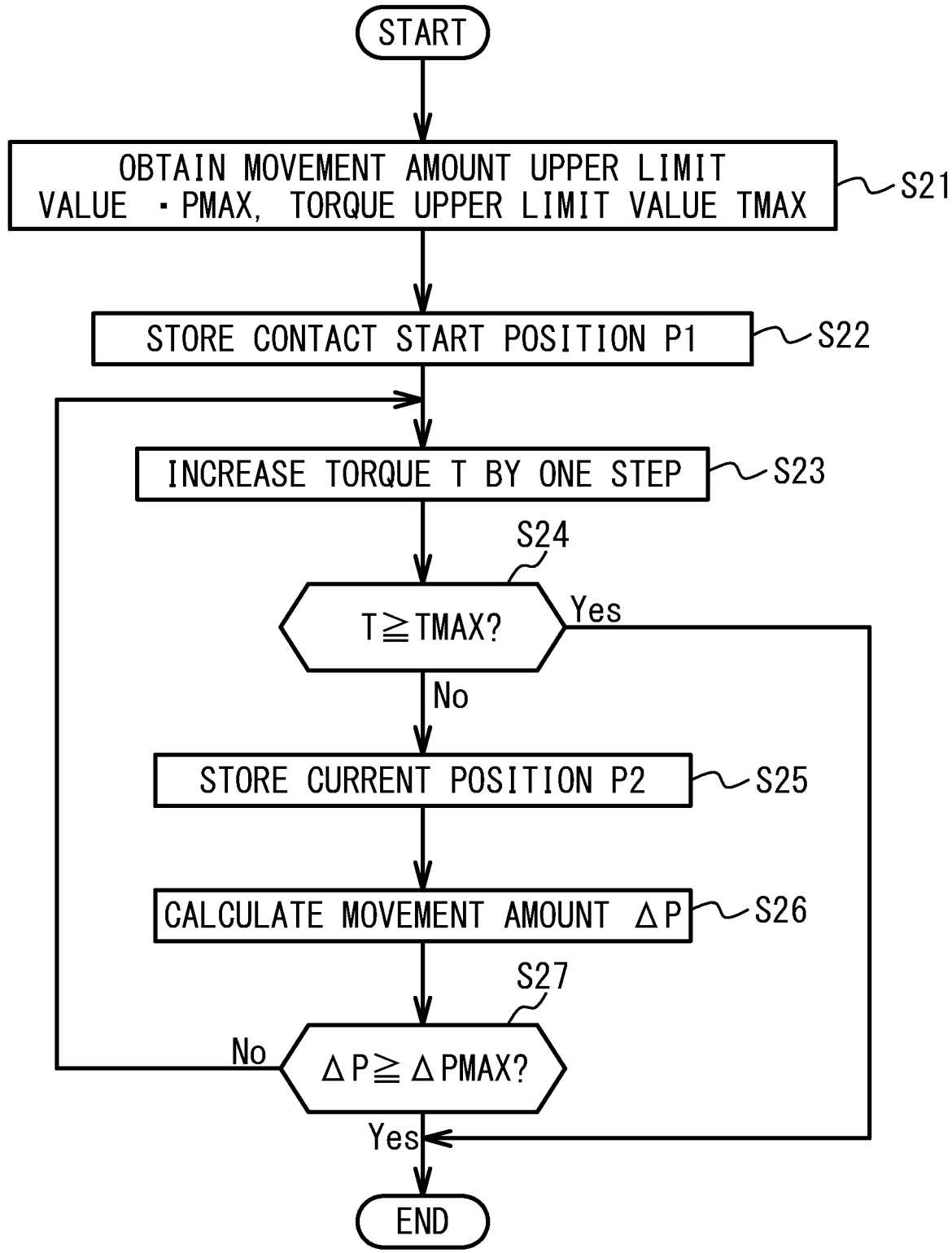
FIG. 5 is a flowchart illustrating an example of increasing process.

The increasing process will be described. FIG. 5 is a flowchart illustrating an example of the increasing process. The control unit 11 obtains a torque upper limit value Tmax and a movement amount upper limit value $\Delta$Pmax (step S21). The torque upper limit value Tmax and the movement amount upper limit value $\Delta$Pmax may be stored in in advance in the ROM described above may be used, or numerical values transferred from the robot controller 100 may be stored in the RAM described above and used. The torque upper limit value Tmax is a value greater than the torque limit value Tr. Next, the control unit 11 temporarily stores in the memory a contact start position P1 determined in the limiting process that all the claws 60 have come into contact with the workpiece (step S22). Next, the control unit 11 increases the torque T by one step (step S23). Specifically, the control setting is changed so that the torque increases in accordance with the control characteristic of a motor employed as the motor 30. For example, an absolute value of the current of the coil of each phase of the motor 30 is increased, or the duty ratio of the PWM control is increased. Here, "increase by one step" means discretely increasing the torque T of the motor 30. The "increase by one step" means that the torque T fluctuates before and after the increase, and large energy is transmitted from the motor 30 to the drive gear 40 with respect to the friction loss in the meshing mechanism of the drive gear 40 and the driven gear 50 described above. In the meshing mechanism, when the meshing speed decreases, there is a possibility that the meshing stops due to a friction loss. Specifically, since the friction that has been acting so far changes from dynamic friction to static friction, and the static friction is larger than the dynamic friction, the meshing mechanism might fall into a so-called stuck state. In order for the meshing mechanism to start to move again, a torque impact is applied to the meshing mechanism by an increase in the torque T in discrete values, so it is possible to make a transition from static friction to dynamic friction.

Next, the control unit 11 determines whether or not the torque T is equal to or greater than the torque upper limit value Tmax (step S24). In the case of Yes in step S24, the increasing process ends, and a maintaining process of maintaining the current torque T of the motor 30 at the torque upper limit value Tmax is executed (step S30).

In the case of No in step S24, the control unit 11 temporarily stores a current position P2 of the claws 60 in the memory (step S25). Next, the control unit 11 calculates a movement amount ΔP of the claws 60 which is a difference between the contact start position P1 and the current position P2 (step S26). Next, the control unit 11 determines whether or not the calculated movement amount ΔP is equal to or greater than the movement amount upper limit value ΔPmax (step S27). In the case of No in step S27, the process of step S23 is executed again. In this case, the torque T is further increased by one step in step S23. As a result, as long as No is determined in steps S27 and S24, the torque T increases at a constant rate of increase. In the case of Yes in step S27, the increasing process ends, and a maintaining process of maintaining the current torque T of the motor 30 is executed (step S30).

Figure 6:
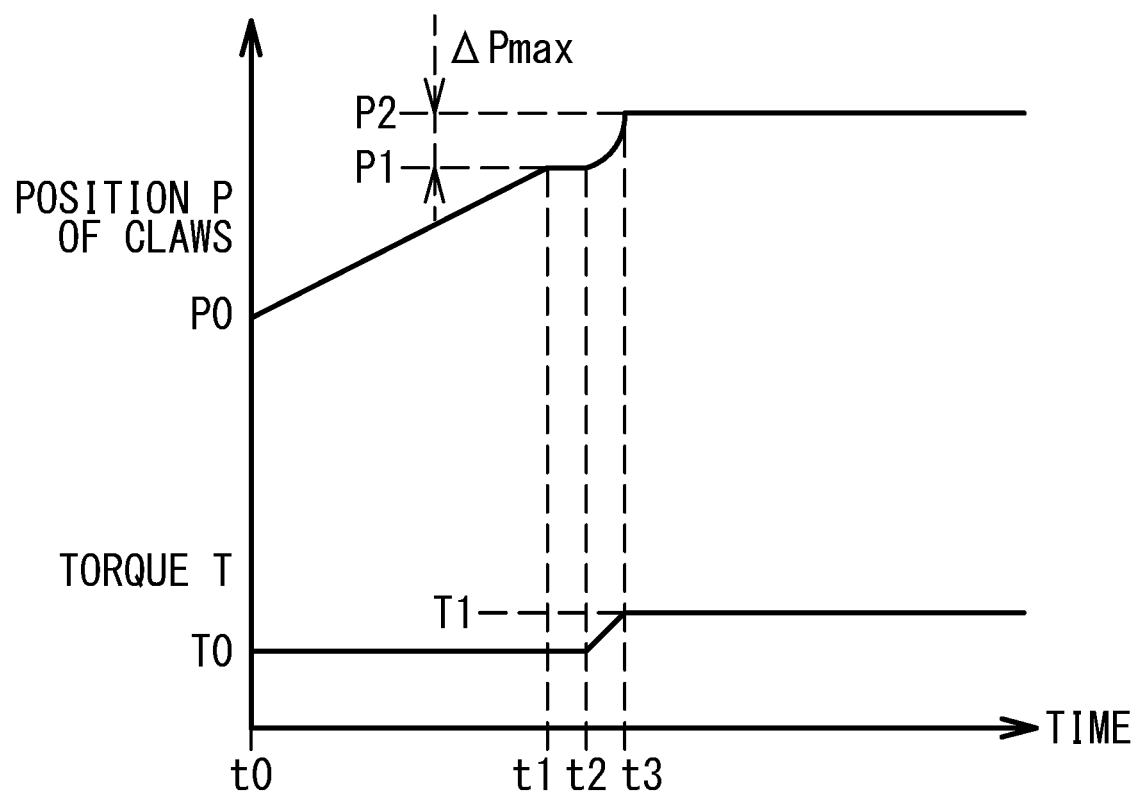
FIG. 6 is a timing chart illustrating a transition between a position of claws and a torque of a motor when a soft workpiece is gripped.

Next, a transition between the position P of the claws 60 and the torque T of the motor 30 when the workpiece is gripped will be described. FIG. 6 is a timing chart illustrating changes in the position P and the torque T of the motor 30 when a soft workpiece is gripped. At time T0, the torque T is maintained substantially constant at a torque T0 equal to or less than the torque limit value Tr, and the position P of the claws 60 gradually moves from an initial position P0. At time t1, the position P of the claws 60 reaches the contact start position P1 at which all the claws 60 come into contact with the workpiece. Since the position P of the claws 60 do not move and it is determined that all the claws 60 are in contact with the workpiece at time t2, the torque T increases and the positions P of the claws 60 start to move. When the movement amount Δ P, which is the difference between the current position P2 and the contact start position P1, reaches the movement amount upper limit value ΔPmax at time t3, the torque T is maintained at the torque T1 at that time. In this way, it is possible to grip a soft workpiece with a weak gripping force that does not damage the workpiece.

Figure 7:
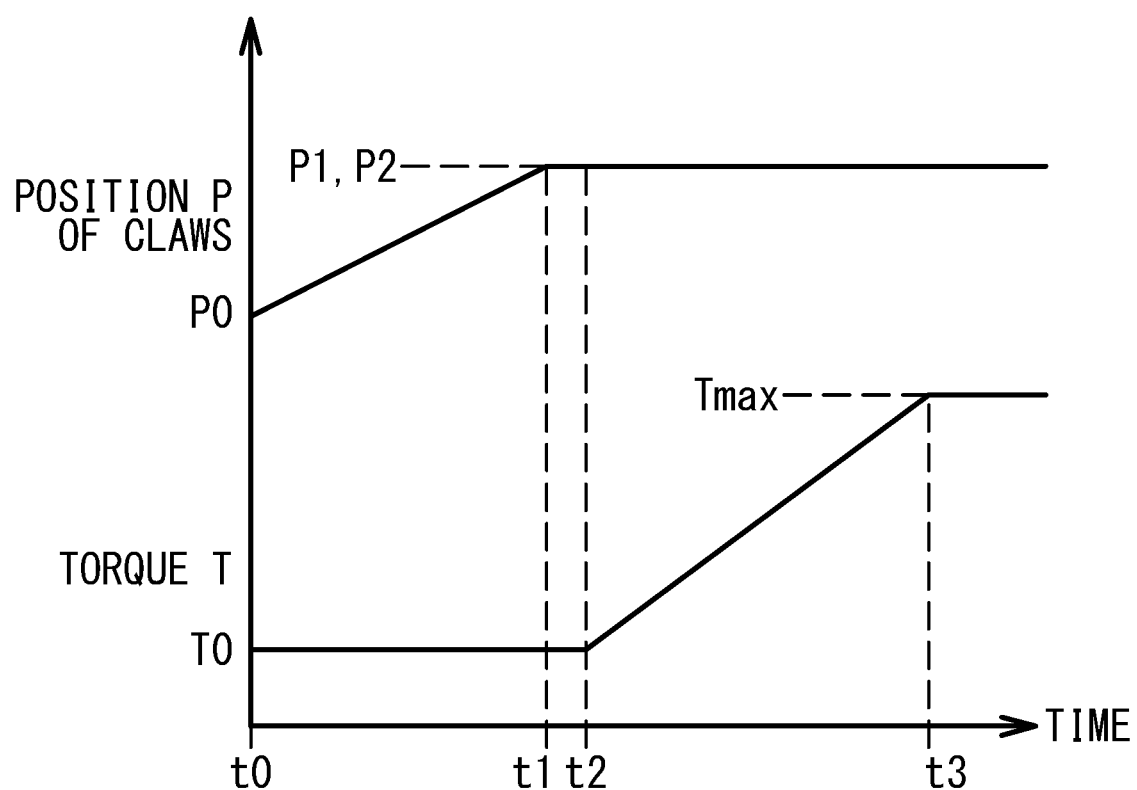
FIG. 7 is a timing chart illustrating the transition between the position of the claw and the torque of the motor when a hard workpiece is gripped.

FIG. 7 is a timing chart illustrating changes in the position P of the claws 60 and the torque T of the motor 30 when a hard workpiece is gripped. Similarly to the case illustrated in FIG. 6, after times t0, t1, and t2 are reached, the torque T increases, but the current position P2 does not move from the contact start position P1. For this reason, the torque T further increases, becomes equal to or greater than the torque upper limit value Tmax at time t3, and the torque T is maintained at the upper limit value Tmax. In this way, it is possible to grip a hard workpiece with a gripping force that is strong enough to prevent the hard workpiece from falling.

The above described limiting process (step S10) will be supplemented. The main point of the limiting process is to detect the position of the workpiece. In other words, the limiting process is a control of the claws 60 for searching for the presence of a workpiece. The torque T is set to a relatively weak value so as not to damage the workpiece in order to detect the position of the workpiece. On the other hand, when the torque T is weak (low value), the rotational speed of the motor 30 becomes slow depending on the type or control method of the driver circuit 13 to be employed or the type of the motor 30 to be employed, and it might take time to detect the position of the workpiece. In order to avoid such inconvenience, it is also possible to select to operate the motor 30 in a high-speed rotation and low-torque control region during the limiting process and to operate the motor 30 in a low-speed rotation and high-torque control region during the increasing process and the maintaining process. For example, in a case where an inner rotation type brushless DC motor is adopted as the motor 30, this is realized by changing the excitation of the poles by switching the connection of the stator winding. When the motor 30 is provided with a transmission (not illustrated) capable of changing a gear ratio and a ratio between the rotational speed of the motor 30 and the rotational speed of the drive gear 40, it is also possible to rotate the motor 30 in a high-speed and low-torque state with a low reduction ratio during the limiting process, and to rotate the motor 30 in a low-speed and high-torque state with a high reduction ratio during the increasing process and the maintaining process.

As described above, it is not needed to change the setting of the gripping force for each of an unspecified number of types of workpieces, to prepare in advance to obtain the deformation ratio of the workpiece, and to provide a pressure sensor for measuring the gripping force based on the rotational position of the motor 30 detected by the encoder 20. Therefore, it is possible to grip the workpiece with an appropriate gripping force according to the hardness of the workpiece by a simple method.

With the above-described embodiment, a robot to which the robot hand of the present embodiment is applied has the following advantages. First, one robot hand is capable of dynamically coping with an unspecified variety of workpieces. For this reason, it is possible to reduce man-hours for teaching and setup change when constructing a mass-production line. Further, the torque T and the movement amount ΔP is capable of being obtained, after the gripping force of each workpiece is determined by the increasing process. Therefore, for example, in a production line in which workpieces of the same type are continuously fed, the robot hand according to the present embodiment is capable of being used as a measuring instrument while gripping the workpiece. As a result, the torque T and the movement amount ΔP after the determination of the gripping force are regarded as physical properties of each workpiece, the quality of the workpiece is statistically determined, and a non-standard workpiece is discriminated. As a similar application, in a production line in which a plurality of types of workpieces are continuously fed, it is also possible to classify each workpiece based on the torque T or the movement amount ΔP after the determination of the gripping force.

In addition to the torque T and the movement amount ΔP obtained at the time of determining the gripping force of each workpiece in the increasing process as described above, the position P1 of the claw when it is determined in the limiting process that all the claws come into contact with the workpiece in the limiting process, a required time (t2 to t3) until the movement amount ΔP becomes equal to or greater than the movement amount upper limit value ΔPmax, and the like also represent the physical properties of each workpiece. The plurality of physical quantities representing the physical properties of each workpiece are defined as gripping parameters. By using these gripping parameters, the robot hand according to the present embodiment is capable of being widely used. In the case of the above-described production line in which workpieces of the same type are continuously fed, it is possible to accurately detect defective workpieces by setting a threshold value that defines a range of non-defective workpieces in order to determine whether the workpieces are non-defective or defective, and by comparing a gripping parameter obtained by gripping each workpiece with the threshold value. Further, a plurality of non-defective workpieces to be a reference for quality determination are prepared in advance, and the workpieces of the non-defective group are continuously gripped to obtain a gripping parameter, and statistical process is executed to generate a threshold for defining a range of non-defective workpieces. Accordingly, it is possible to detect a defective product by comparing the gripping parameter of each workpiece with the threshold value at the time of subsequent operation of the production line. In addition, since it is not needed for a production line process designer to handle the gripping parameter as a specific numerical value, it is possible to reduce input errors and working man-hours, and to save labor.

The above-described obtainment of the gripping parameter, generation of the threshold value, and comparison between the gripping parameter and the threshold value may be performed by the control unit 11, or may be collectively performed with another robot hand by exchanging needed information with the external robot controller 100 or the like.

While the exemplary embodiments of the present disclosure have been illustrated in detail, the present disclosure is not limited to the above-mentioned embodiments, and other embodiments, variations and variations may be made without departing from the scope of the present disclosure.

What is claimed is:

1. A robot hand comprising:
   a motor;
   claws configured to grip a workpiece in accordance with rotation of the motor;
   an encoder configured to detect a rotational position of the motor; and
   a processor configured to control a torque of the motor such that the claws grip the workpiece in accordance with the rotational position,
   wherein the processor is configured to:
   execute a limiting process of limiting the torque to a torque limit value or less;
   estimate that the claws have come into contact with the workpiece when a speed of the rotational position becomes equal to or less than a threshold value during execution of the limiting process;
   execute an increasing process of gradually increasing the torque to be higher than the torque limit value after the claws come into contact with the workpiece;
   calculate a movement amount from a position at which the claws are in contact with the workpiece to a current position based on the rotational position during execution of the increasing process; and
   execute a maintaining process during the increasing process of:
     (i) checking whether the torque is equal to or greater than a torque upper limit value that is greater than the torque limit value and maintaining the torque when the torque is equal to or greater than the torque upper limit value, and
     (ii) when the torque is checked and the torque is not equal to or greater than the torque upper limit value, checking whether the movement amount is equal to or greater than a movement amount upper limit value and maintaining the torque when the movement amount is equal to or greater than the movement amount upper limit value.

2. The robot hand according to claim 1, wherein the processor is further configured to maintain the torque at a constant value equal to or less than the torque limit value in the limiting process.

3. The robot hand according to claim 1, wherein the processor increases the torque at a constant increase rate during the increasing process.

4. A method for controlling a robot hand, comprising:
   executing a limiting process of limiting a torque of a motor that drives claws to grip a workpiece to a torque limit value or less;
   estimating that the claws have come into contact with the workpiece when a speed of a rotational position of the motor becomes equal to or less than a threshold value during execution of the limiting process;
   executing an increasing process of gradually increasing the torque to be higher than the torque limit value after the claws come into contact with the workpiece;
   calculating a movement amount from a position at which the claws are in contact with the workpiece to a current position based on the rotational position during execution of the increasing process; and
   executing a maintaining process during the increasing process of:
     (i) checking whether the torque is equal to or greater than a torque upper limit value that is greater than the torque limit value and maintaining the torque when the torque is equal to or greater than the torque upper limit value, and
     (ii) when the torque is checked and the torque is not equal to or greater than the torque upper limit value, checking whether the movement amount is equal to or greater than a movement amount upper limit value and maintaining the torque when the movement amount is equal to or greater than the movement amount upper limit value.

* * * * *